Patented Nov. 11, 1941

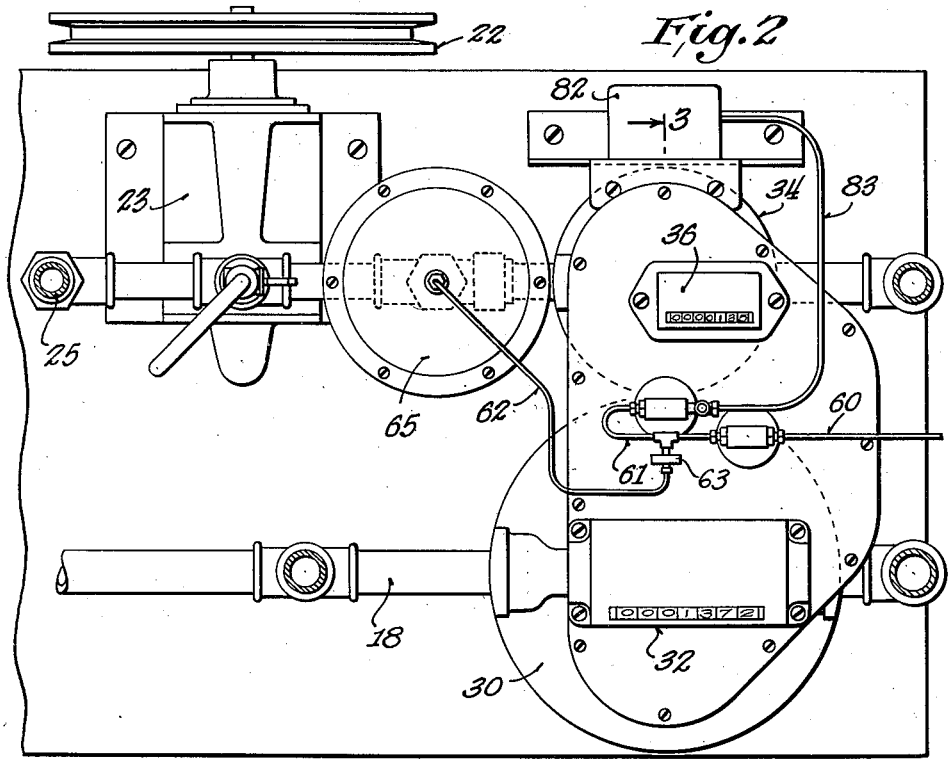
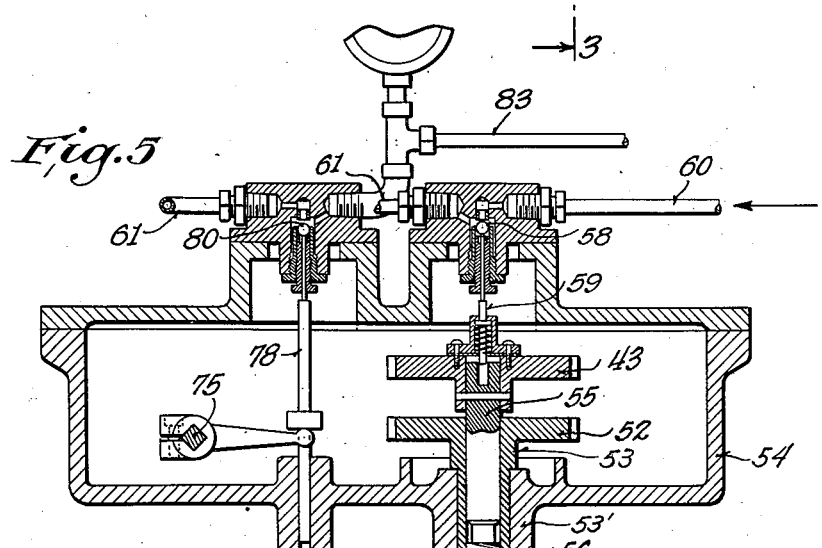
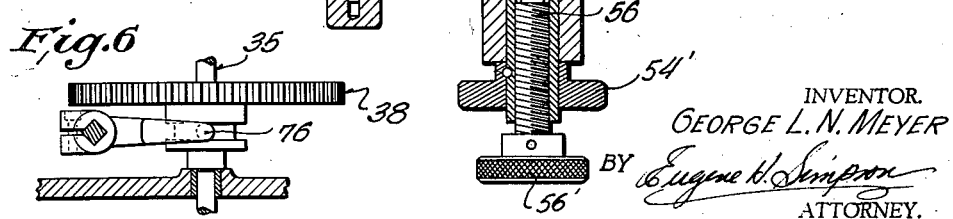

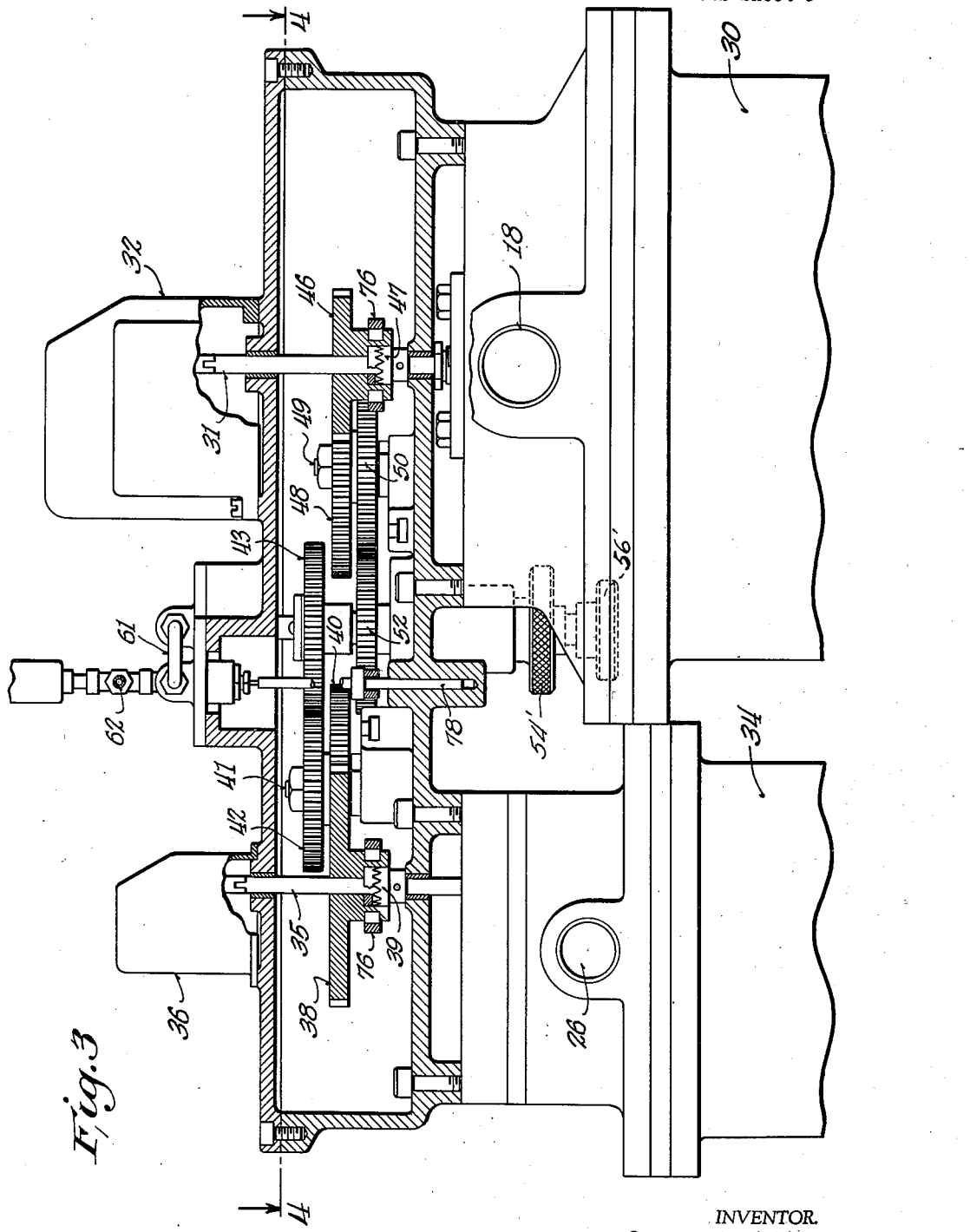

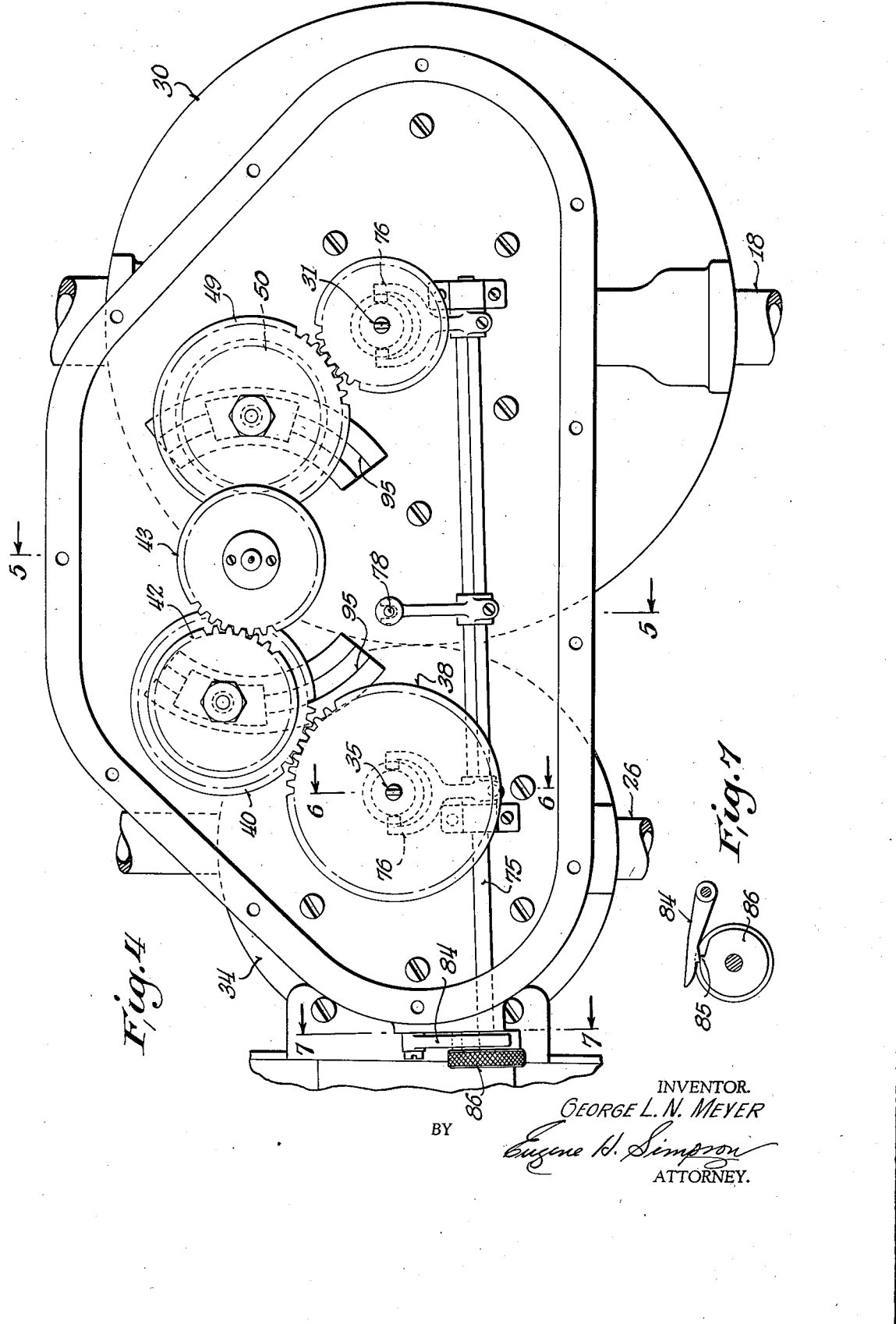

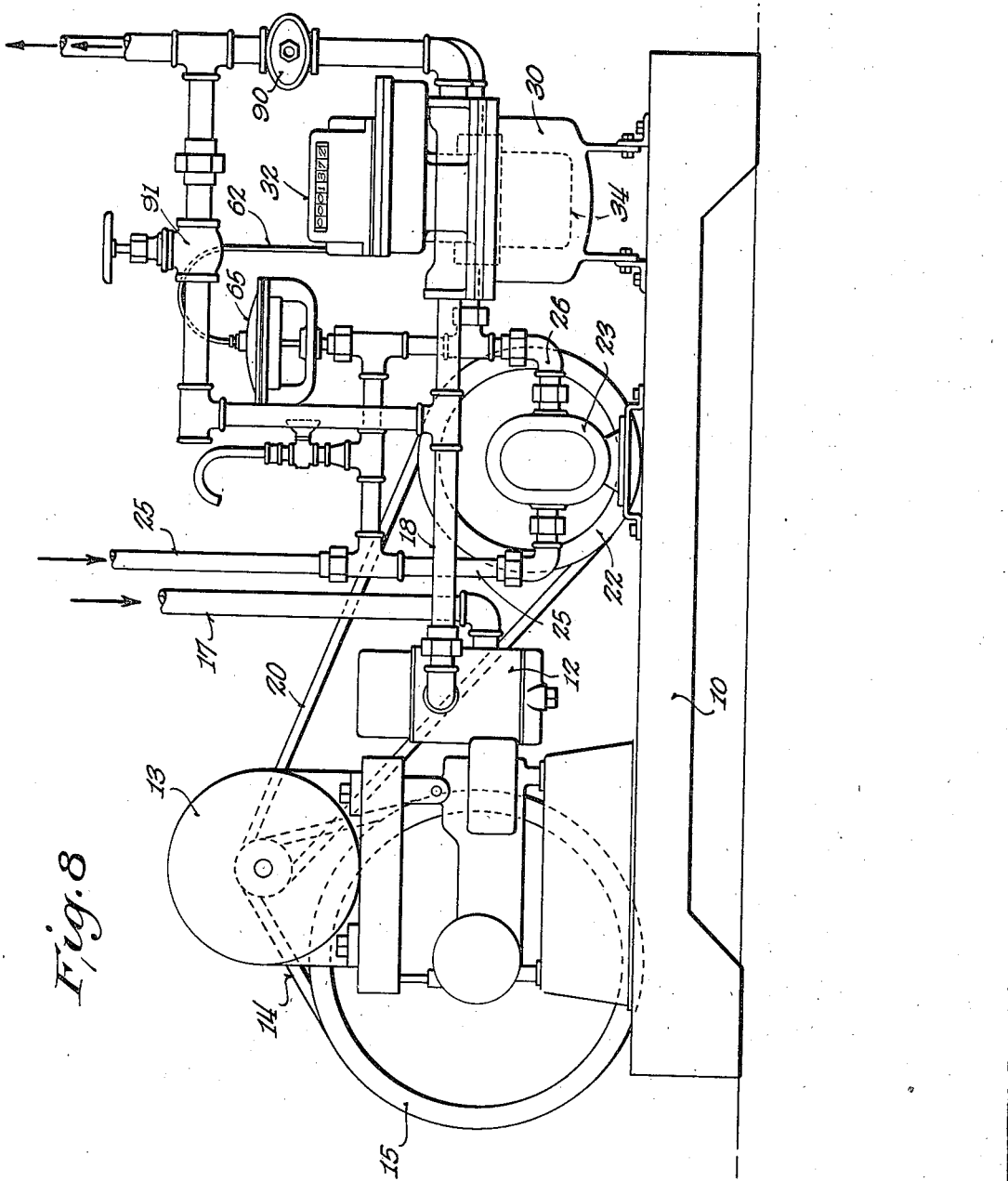

2,262,031

UNITED STATES PATENT OFFICE 2,262,031

FLUID PROPORTIONING DEVICE

George L. N. Meyer, Milwaukee, Wis.

Application May 6, 1940, Serial No. 333,557

19 Claims. (Cl. 221—96)

This invention relates to fluid proportioning devices and more particularly to a fluid proportion device adapted to supply two or more liquids in an exact proportion.

In preparing carbonated beverages, such as root beer, and various flavored so-called soda waters, it is necessary, for best results, to keep the proportion of syrup to water constant and uniform.

In applicant's co-pending application, Serial No. 289,926, filed August 12, 1939, now Patent No. 2,227,101, issued December 31, 1940, there is disclosed a method of preparing carbonated beverages in bulk for bottling. The present machine is adaptable to this method in that it supplies a constant flow of syrup and carbonated water to a carbonator. Since even small variations in the proportion of syrup and water seriously affect the beverage it is necessary that an exact proportion be maintained. While the present fluid proportioning device is applicable to the method disclosed in applicant's co-pending application aforesaid, it is to be understood that its use is not confined or limited to proportioning syrup and water to form a carbonated beverage, but that it may be used to supply any two liquids in exact proportion.

One object of the present invention is to provide an apparatus which will deliver two liquids to a source in an exact and uniform proportion.

Another object is to provide an apparatus which will adjust the flow of one liquid to the flow of another liquid so as to maintain the proportions of the liquids uniform.

A further object is to provide an apparatus which will deliver two liquids to a source in exact proportion and in which the quantity of liquid delivered is readily ascertainable.

Another object is to provide an apparatus which will adjust the flow of one liquid to the flow of another liquid so as to maintain the proportions of the liquids uniform and which has means thereon to shut down the entire apparatus in the event of the adjustment exceeding the limits of the machine.

A further object is to provide an apparatus which will shut down in the event of stoppage of one part thereof.

A further object is to provide an apparatus to supply two liquids in a given proportion which will automatically shut down upon stoppage of the flow of one of the liquids.

A further object is to improve the mixing of syrup and carbonated water in a carbonated beverage.

A further object is to provide an apparatus which will supply a uniformly mixed carbonated beverage to a filling machine.

A further object is to provide an apparatus to supply two liquids in a given proportion which will place no strain upon the measuring devices employed.

A further object is to provide an apparatus which can be manufactured economically and which will be positive and accurate in operation.

Other objects will be apparent upon considering the following specification, which, taken in connection with the accompanying drawings, illustrates one form of the invention.

According to the present invention, two liquid pumps are used to deliver liquids through two separate meters, and the flow of the two liquids through the meters is utilized to vary the flow of the liquid through one of said meters in accordance with variations of flow of the other liquid through its meter to maintain the liquids in a desired proportion.

In the drawings:

Fig. 2 is a top plan view of a portion of the fluid proportioning device shown in Fig. 1;

Fig. 3 is a cross-sectional view on line 3—3 of Fig. 2 looking in the direction of the arrows;

Fig. 4 is a cross-sectional view on line 4—4 of Fig. 3 looking in the direction of the arrows;

Figure 1:
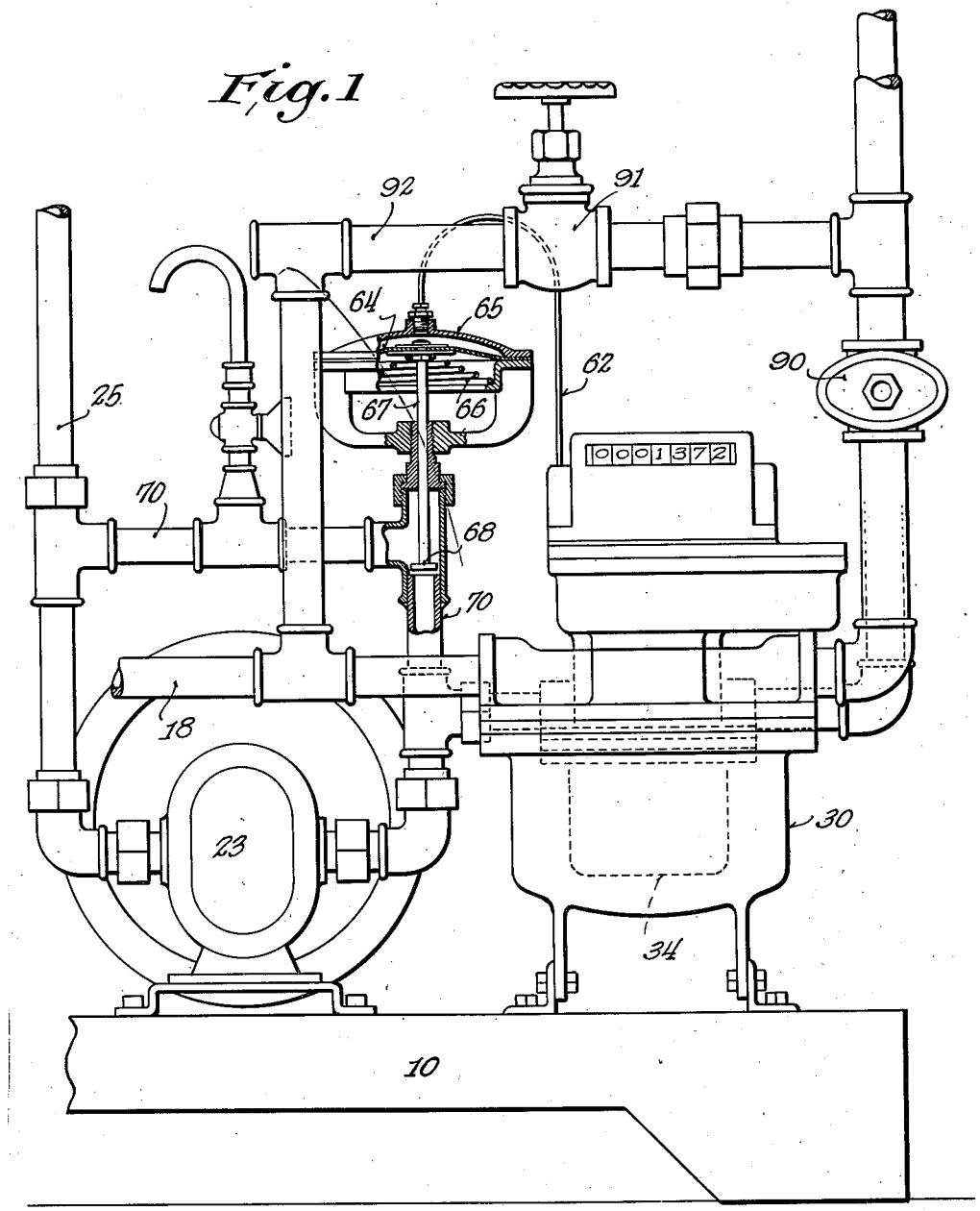
Fig. 1 is a side elevational view of a portion of a fluid proportioning device embodying the present invention with certain parts thereof being shown in section to more clearly illustrate other parts.

Figs. 5, 6 and 7 are cross-sectional views on lines 5—5, 6—6 and 7—7, respectively, of Fig. 4 looking in the direction of the arrows; and Fig. 8 is a side elevational view of the entire fluid proportioning device.

Referring to Fig. 8, the fluid proportioning device is built on a base 10, on which is mounted a water pump 12. The water pump 12, which may be a multi-cylinder, reciprocating piston type, is operated by a motor 13 through a V-belt 14 and pulley 15. The water is drawn into the pump through a pipe 17 and discharged through a pipe 18.

The motor 13 has a second V-belt 20 running therefrom which drives a pulley 22. The pulley 22 operates a syrup pump 23 which preferably is a gear or other positive displacement pump drawing its supply of syrup through a pipe 25 and discharging it through a pipe 26.

Water flowing through the pipe 18 passes through a water meter 30 and turns a shaft 31 (seen best in Fig. 3) which operates a counter 32, shown in Fig. 2, which records the quantity of water that has passed through the meter in any convenient units. Simultaneously, syrup flows through the pipe 26 and passes through a syrup meter 34 which operates a shaft 35 and records the quantity of syrup, which has passed through the meter, on a counter 36, shown in Fig. 2.

In order to regulate the quantity of syrup and to synchronize the same to the quantity of water flowing through the apparatus, a gear 38 (Figs. 3 and 4), is mounted on the syrup meter shaft 35 through a jaw clutch mechanism 39 in such a manner that any stoppage of the gear 38 raises the gear 38 on the shaft 35 disengaging the clutch 39 and permits the shaft 35 to rotate independently of the gear 38. The gear 38 is in constant mesh with and rotates a gear 40 mounted on a shaft 41 and turns a gear 42 mounted on the same shaft. The gear 42 is in mesh with and rotates a gear 43 (Figs. 3 and 5) which is a part of the central control mechanism.

Likewise, the shaft 31 from the water pump has mounted thereon a gear 46 through a jaw clutch 47 similar to the jaw clutch 39 and arranged so that stoppage of the gear 46 causes that gear to rise on the jaw clutch 47 until the latter is disengaged and the shaft 31 permitted to rotate independently of the gear 46. The gear 46 is in mesh with and turns a gear 48 fixed on a shaft 49 which turns a gear 50 fixed on the same shaft. The gear 50 is in mesh with and rotates a gear 52 which, like the gear 43, comprises a part of the central control mechanism.

For convenience the gears 38, 40, 42, 43, 46, 48, 50 and 52 may be mounted in a housing 54 which may be carried on top of the meters 30 and 34.

Referring now to Fig. 5, which shows the details of the central control mechanism, it will be seen that the gear 52 is mounted on a hollow shaft 53 in a bearing 53' in the housing 54. The shaft 53 is free to turn in the bearing 53' while being held at a fixed elevation therein between the gear 52 and a handle 54'.

The lower end of the interior of the hollow shaft 53 is threaded to receive the lower threaded end 56 of a shaft 55. The shaft 55 has the gear 43 fixed thereto at the upper end thereof. The shaft 55, therefore, moves upwardly or downwardly in the shaft 53 due to the screw thread connection between the shafts when any difference in angular speed occurs between the gears 43 and 52.

A handle 56' is fixed on the lower end of the thread 56, and is adapted to contact the lower end of the hollow shaft 53 to limit the upward movement of the gear 43 and shaft 55. Similarly, the downward movement of the gear 43 and shaft 55 is limited by contact of the gears 43 and 52.

If a larger quantity of syrup is being pumped than is required to maintain the exact proportion, the gear 43 turns faster than the gear 52 which causes the gear 43 to rise on the screw thread 56. As the gear 43 rises it causes a spring-pressed plunger 59 to lift a ball check valve 58 upwardly away from its seat. Raising the valve away from its seat permits air under pressure entering through a pipe line 60 to leak past the valve and past the plunger 59 and escape to the atmosphere. Reduction of the air pressure in the pipe line 60 reduces the air pressure in the outgoing pressure line 61 which reduces the pressure in a pipe 62. The amount that the pressure is reduced by the escape of air past the valve is directly proportional to the leakage past the valve and hence to the distance of the valve 58 from its seat. Air pressure in the pipe 62 may be recorded on a gage 63, shown in Fig. 2.

Reduction of pressure in the pipe 62, as may be seen best in Fig. 1, reduces the pressure above a diaphragm 64 of a pressure control 65, causing a spring 66 to move a stem 67 upwardly, opening a valve 68, which permits a greater amount of syrup to by-pass through a connection 70 past the valve 68 and into the inlet pipe 25 where it again runs through the pump 23, thus reducing the quantity of syrup flowing through the meter.

Conversely, should a larger amount of water be pumped than is required, the gear 52 will travel faster than the gear 43 causing the gear 43 to move downwardly on the screw 56, reducing the leakage past the valve 58 and increasing the pressure in the pipes 61—62. Increase of pressure in the pipe 62 increases the pressure on the diaphragm 64 causing the valve 68 to lower and thus reduce the amount of syrup being by-passed around the syrup pump 23 and consequently increasing the amount of syrup passing through the meter.

In the event that the adjustment exceeds the limits of the machine, so that the gear 43 continues either to rise or fall, the gears 43 and 52 become locked together, either by contact of the gears 43 and 52 due to lowering of the gear 43 or by contact of the handle 56' with the lower end of the shaft 53. When the gears 43 and 52 become locked by movement of the gear 43 either upwardly or downwardly either or both of the gears 38 and 46 are caused to rotate at a different angular velocity than the shaft on which they are mounted. This difference in angular velocity causes either the clutch 39 to lift the gear 38 on the shaft 35 or the clutch 47 to lift the gear 46 on the shaft 31. Raising either of the gears 38 or 46 turns a shaft 75 through collar and yokes 76—76.

As seen in Fig. 5, turning the shaft 75 raises a plunger 78 which raises a second ball 80 off its seat causing a relatively large reduction of pressure in the pipe 61. This large reduction in pressure in the pipe 61 is transmitted to a pressure control switch 82 through a pipe line 83 in communication with the pipe 61. Leakage past the valve 80 due to raising the valve by the plunger 78 is sufficient to cause operation of the pressure control switch 82 which shuts off current to the motor 13 thus stopping the operation of the entire machine. When the plunger 78 raises the valve 80 off its seat due to the turning of the shaft 75 by the collar 76 the valve 80 is kept off its seat by a finger 84 which engages a notch 85 in a wheel 86 fixed on the shaft 75. Thus before the motor can be restarted the finger 84 must be manually disengaged from the notch 85 and the check valve 80 returned to its seat. It is also necessary to reset or unlock the gears before restarting. This is done by holding the handle 54' against turning and turning the handle 56' so as to free the two gears 43 and 52 from each other.

At times it is desirable to wash out certain parts of the apparatus independently of the proportioning device. For this purpose a shut-off valve 90 is provided in the water pipe leading from the water meter and a cock 91 opened in a by-pass 92 leading from the water pump delivery pipe 18 around the water meter 30.

Since the gears 38, 40, 42, 43, 46, 48, 50 and 52 are mere control gears and do no work, they impose no strain on the shafts 31 and 35. Hence the meters 30 and 34 give accurate readings and a true and exact proportion is obtained.

The apparatus just described will give a definite proportion of liquids and deliver the same in accurate quantities to any given source. To change the proportion of syrup and water pumped, the gears 38 and 40, and 46 and 48, are changed so as to have a gear ratio which will give the required proportion and the new gears adjusted in the machine by means of T-slots 95—95. Any given ratio may be obtained by arranging the gears 38—40 and 46—48. It is obvious that this apparatus can readily be expanded to deliver three or more liquids in a desired proportion without deviating from the principles set forth herein.

Having thus described the invention, it will be seen that it is susceptible to various changes and modifications and that it is not, therefore, desired to limit the invention to the precise form herein shown and described but only by the scope of the appended claims.

Having thus described the invention, it is hereby claimed as follows:

1. In a device of the character described, a liquid pump, a liquid meter, liquid conducting means connecting said pump and said meter whereby liquid delivered from said pump flows through said meter and is measured thereby, a second liquid pump, a second liquid meter, means connecting said second liquid pump with said second liquid meter whereby liquid pumped by said second liquid pump passes through said second liquid meter and is measured thereby, means located between said second pump and said second meter responsive to the flow of liquid through both of said meters to vary the flow of liquid through said second meter to maintain the flow through said meters in an exact proportion, and means connected with each of said meters to stop both pumps upon failure of said last named means to maintain the desired proportion.

2. A fluid proportioning device of the character described, comprising, a first liquid pump, a first meter adapted to receive and record the flow of liquid from said pump, a second liquid pump, a by-pass between the discharge and the intake of said second pump, a valve in said bypass adapted to vary the quantity of liquid bypassed between the discharge and the intake, a second meter adapted to receive and record that portion of the flow of liquid from said second pump not by-passed around said second pump, and pressure actuated means responsive to the flow of liquids through said meters to vary the setting of said valve to maintain the flow of liquids through said meters in a desired proportion.

3. A fluid proportioning device of the character described, comprising, a first liquid pump, a first meter adapted to receive and record the flow of liquid from said pump, a second liquid pump, a by-pass between the discharge and the intake of said second pump, a valve in said bypass adapted to vary the quantity of liquid bypassed between the discharge and the intake, a second meter adapted to receive and record that portion of the flow of liquid from said second pump not by-passed around said second pump, pressure actuated means responsive to relatively small changes of flow of liquids through said meters to vary the setting of said valve and maintain the flow of liquids in a desired proportion, and pressure actuated means responsive to large variations in flow to stop the operation of both pumps.

4. A fluid proportioning device of the character described comprising, a first fluid pump, delivery means adapted to receive fluid from said pump and deliver it to a source, metering means in said fluid delivery means adapted to measure the flow of fluid therethrough, a second fluid pump, a second delivery means adapted to receive fluid from said second pump and deliver it to a source, a second metering means in said second delivery means adapted to measure the flow of fluid therethrough, a by-pass between the intake and delivery means of said second pump, said by-pass opening into said second delivery means between said second pump and said second metering means, a valve in said by-pass adapted to control the flow of fluid therethrough, and means operable by said metering means to actuate said valve and maintain the proportion of fluids pumped through said meters constant.

5. A fluid proportioning device of the character described comprising, a first fluid pump, delivery means adapted to receive fluid from said pump and deliver it to a source, metering means in said fluid delivery means adapted to measure the flow of fluid therethrough, a second fluid pump, a second delivery means adapted to receive fluid from said second pump and deliver it to a source, a second metering means in said second delivery means adapted to measure the flow of fluid therethrough, a by-pass between the intake and delivery means of said second pump, said by-pass opening into said second delivery means between said second pump and said second metering means, a valve in said by-pass adapted to control the flow of fluid therethrough, and means including a differential actuated by said metering means to actuate said valve and maintain the proportion of fluids pumped through said meters constant.

6. A fluid proportioning device of the character described comprising, a first fluid pump, delivery means adapted to receive fluid from said pump and deliver it to a source, metering means in said fluid delivery means adapted to measure the flow of fluid therethrough, a second fluid pump, a second delivery means adapted to receive fluid from said second pump and deliver it to a source, a second metering means in said second delivery means adapted to measure the flow of fluid therethrough, a by-pass between the intake and delivery means of said second pump, said by-pass opening into said second delivery means between said second pump and said second metering means, a valve in said by-pass adapted to control the flow of fluid therethrough, fluid pressure means to actuate said valve, and means actuated by said metering means to vary the pressure in said fluid pressure means and change the setting of said valve whereby a constant proportion of fluids is delivered by said pumps.

7. A fluid proportioning device of the character described comprising, a first fluid pump, delivery means adapted to receive fluid from said pump and deliver it to a source, metering means in said fluid delivery means adapted to measure the flow of fluid therethrough, a second fluid pump, a second delivery means adapted to receive fluid from said second pump and deliver it to a source, a second metering means in said second delivery means adapted to measure the flow of fluid therethrough, a by-pass between the intake and delivery means of said second pump, said by-pass opening into said second delivery means between said second pump and said second metering means, a valve in said by-pass adapted to control the flow of fluid therethrough, means operable by said metering means to actuate said valve and maintain the proportion of fluids through said meters constant, and means attached to each meter to stop both pumps upon failure of either pump to maintain the desired proportion.

8. A fluid proportioning device of the character described comprising, a first fluid pump, delivery means adapted to receive fluid from said pump and deliver it to a source, metering means in said fluid delivery means adapted to measure the flow of fluid therethrough, a second fluid pump, a second delivery means adapted to receive fluid from said second pump and deliver it to a source, a second metering means in said second delivery means adapted to measure the flow of fluid therethrough, a by-pass between the intake and delivery means of said second pump, said by-pass opening into said second delivery means between said second pump and said second metering means, a valve in said by-pass adapted to control the flow of fluid therethrough, means including a differential actuated by said metering means to actuate said valve and maintain the proportion of fluids pumped through said meters constant, and means to stop both pumps upon failure of either pump to maintain the desired proportion.

9. A fluid proportioning device of the character described comprising, a first fluid pump, delivery means adapted to receive fluid from said pump and deliver it to a source, metering means in said fluid delivery means adapted to measure the flow of fluid therethrough, a second fluid pump, a second delivery means adapted to receive fluid from said second pump and deliver it to a source, a second metering means in said second delivery means adapted to measure the flow of fluid therethrough, a by-pass between the intake and delivery means of said second pump, said by-pass opening into said second delivery means between said second pump and said second metering means, a valve in said by-pass adapted to control the flow of fluid therethrough, fluid pressure means to actuate said valve, means actuated by said metering means to vary the pressure in said fluid pressure means and change the setting of said valve whereby a constant proportion of fluids is delivered by said pumps, and means to stop both pumps upon failure of either pump to maintain the desired proportion.

10. A fluid proportioning device of the character described comprising, a first fluid pump, delivery means adapted to receive fluid from said pump and deliver it to a source, metering means in said fluid delivery means adapted to measure the flow of fluid therethrough, a second fluid pump, a second delivery means adapted to receive fluid from said second pump and deliver it to a source, a second metering means in said second delivery means adapted to measure the flow of fluid therethrough, a by-pass between the intake and delivery means of said second pump, said by-pass opening into said second delivery means between said second pump and said second metering means, a valve in said by-pass adapted to control the flow of fluid therethrough, means operable by said metering means to actuate said valve and maintain the proportion of fluids pumped through said meters constant, and fluid pressure means to stop both pumps upon failure of either pump to maintain the desired proportion.

11. A fluid proportioning device of the character described comprising, a first fluid pump, delivery means adapted to receive fluid from said pump and deliver it to a source, metering means in said fluid delivery means adapted to measure the flow of fluid therethrough, a second fluid pump, a second delivery means adapted to receive fluid from said second pump and deliver it to a source, a second metering means in said second delivery means adapted to measure the flow of fluid therethrough, a by-pass between the intake and delivery means of said second pump, said by-pass opening into said second delivery means between said second pump and said second metering means, a valve in said by-pass adapted to control the flow of fluid therethrough, means including a differential actuated by said metering means to actuate said valve and maintain the proportion of fluids pumped through said meters constant, and fluid pressure means to stop both pumps upon failure of either pump to maintain the desired proportion.

12. A fluid proportioning device of the character described comprising, a first fluid pump, delivery means adapted to receive fluid from said pump and deliver it to a source, metering means in said fluid delivery means adapted to measure the flow of fluid therethrough, a second fluid pump, a second delivery means adapted to receive fluid from said second pump and deliver it to a source, a second metering means in said second delivery means adapted to measure the flow of fluid therethrough, a by-pass between the intake and delivery means of said second pump, said by-pass opening into said second delivery means between said second pump and said second metering means, a valve in said by-pass adapted to control the flow of fluid therethrough, fluid pressure means to actuate said valve, means actuated by said metering means to vary the pressure in said fluid pressure means and change the setting of said valve whereby a constant proportion of fluids is delivered by said pumps, and fluid pressure means to stop both pumps upon failure of either pump to maintain the desired proportion.

13. In a device of the character described, a first pump adapted to supply a flow of one fluid, a second pump adapted to supply a flow of a second fluid, a first named means adapted to vary the flow of one of said fluids in proportion to the flow of the other said fluid to maintain the fluids in a desired ratio, and a second named means operable from the flow of either of said fluids to stop both pumps upon failure of said first named means to maintain the desired ratio.

14. In a device of the character described, a first fluid source, a first fluid meter, means to deliver fluid from said source to said meter to be measured thereby, a second fluid source, a second fluid meter, means to deliver fluid from said second fluid source to said second fluid meter to be measured thereby, means operated from said meters to maintain the flow of fluids in a desired proportion, a clutch interposed between said last named means and one of said meters, and means operable upon disengagement of said clutch to shut off the flow of fluid to both meters.

15. In a device of the character described, a first fluid source, a first fluid meter, means to deliver fluid from said source to said meter to be measured thereby, a second fluid source, a second fluid meter, means to deliver fluid from said second fluid source to said second fluid meter to be measured thereby, means operated from said meters to maintain the flow of fluids in a desired proportion, a clutch interposed between said last named means and said first meter, a second clutch interposed between said last named means and said second meter, and means operable upon disengagement of either of said clutches to shut off the flow of fluid to both said meters.

16. In a device of the character described, a first fluid source, a first fluid meter, a shaft in said meter rotatable in direct proportion to the amount of fluid passing therethrough, means to deliver fluid from said source to said meter to be measured thereby, a second fluid source, a second fluid meter, a shaft in said second fluid meter rotatable in direct proportion to the amount of fluid passing therethrough, means to deliver fluid from said second fluid source to said second meter to be measured thereby, means operated from said shafts to maintain the flow of fluids through the meters in a desired proportion, an overload clutch mounted on one of said shafts and adapted to transmit movement from that shaft to said last named means and to disengage upon receiving an overload, and means operated by said clutch to stop the flow of fluid upon disengagement of said clutch.

17. A fluid flow regulator of the character described comprising, a first meter, a shaft A in said meter rotatable in proportion to the flow of fluid through said meter, a second fluid meter, a shaft B in said second fluid meter rotatable in proportion to the flow of fluid through said second meter, a shaft C mounted intermediate said meters, a gear D mounted on said shaft C and adapted to turn the same, a shaft E in threaded engagement with shaft C, said shafts C and E having relative axial movement upon being turned at different speeds, a gear F mounted on shaft E and adapted to turn the same, gearing operable between shaft A and gear D and between shaft E and gear F to turn gears D and F at the same speed when fluids are flowing through said meters in a desired proportion, and means operable upon axial movement of shafts C and E occurring when the desired proportion is not obtained to alter the flow of fluid through one of said meters and restore the desired proportion.

18. In a device of the character described, a first meter having a recording shaft adapted to rotate in proportion to the flow of fluid therethrough, means to supply a flow of fluid through said meter, a second meter having a recording shaft adapted to rotate in proportion to the flow of fluid therethrough, means to supply a flow of fluid through said meter, proportioning means actuated from said shafts and adapted to vary the flow of one fluid in accordance with the flow of the other fluid to maintain the flow through the two meters in proportion, and means attached to one of said shafts between said meter and said proportioning means to stop the flow of fluid through both of said meters upon failure of said proportioning means to maintain the desired ratio of fluids.

19. In a device of the character described, a first meter, means to supply a flow of fluid through said meter, a second meter, means to supply a flow of fluid through said second meter, a proportioning device actuated by both of said meters and adapted to vary the flow of fluid through one of said meters to maintain the ratio of fluids in a desired proportion, an overload clutch connecting said first meter with said proportioning device and adapted to disengage upon failure of said proportioning device to maintain the desired ratio, and means actuated by said clutch to stop the flow of both fluids through both said meters upon failure of said proportioning device to maintain the desired ratio.

GEO. L. N. MEYER.